(12) United States Patent
Cote, Jr.

(10) Patent No.: US 6,731,203 B2
(45) Date of Patent: May 4, 2004

(54) VEHICLE ANTI-THEFT SYSTEM

(76) Inventor: Edward E. Cote, Jr., P.O. Box 550, Ashland, NH (US) 03217

(*) Notice: Subject to any disclaimer, the term of this patent is extended or adjusted under 35 U.S.C. 154(b) by 53 days.

(21) Appl. No.: 10/202,965

(22) Filed: Jul. 24, 2002

(65) Prior Publication Data

US 2004/0017283 A1 Jan. 29, 2004

(51) Int. Cl.$^7$ .............................................. B60R 25/10
(52) U.S. Cl. ............................ 340/426.1; 340/426.11; 340/426.12; 340/426.27; 239/124; 180/287; 307/10.2
(58) Field of Search ...................... 340/426.1, 425.5, 340/426.11, 426.12, 426.27, 426.28, 426.13, 426.16; 296/190.1; 239/124, 125; 180/287; 307/10.2

(56) References Cited

U.S. PATENT DOCUMENTS

| | | | |
|---|---|---|---|
| 5,280,268 A | * | 1/1994 | Matthews ................... 340/428 |
| 5,493,268 A | * | 2/1996 | Lewis, Sr. et al. .......... 340/426 |
| 5,703,563 A | * | 12/1997 | Abe, Jr. ..................... 340/426 |
| 5,796,330 A | * | 8/1998 | Vinette ....................... 340/426 |

* cited by examiner

*Primary Examiner*—Davetta W. Goins
(74) *Attorney, Agent, or Firm*—Davis & Bujold, PLLC

(57) ABSTRACT

A vehicle anti-theft system includes a paint dispensing system including a paint container, a paint propellant device, and one or more paint dispensers, the paint dispensers being located adjacent a windshield of the vehicle for dispensing the point onto the windshield. The paint dispensing system is activated by a remotely broadcast disablement signal and dispenses the paint onto the windshield to obscure vision through the windshield. The paint is characterized by being capable of immediately adhering to glass under a range of conditions, being difficult to remove from glass, including when newly applied, being sufficiently opaque to effectively obscure vision through the glass, and being of a visually very dominate and noticeable color.

5 Claims, 1 Drawing Sheet

VEHICLE ANTI-THEFT SYSTEM

FIELD OF THE INVENTION

The present invention relates to vehicle security system and, in particular, to a vehicle security system which both hinders or disables the ability of a driver to drive the vehicle and marks the vehicle in a highly conspicuous manner as a suspect or intentionally disabled vehicle.

BACKGROUND OF THE INVENTION

A recurring major problem with motor vehicles of all types is the various forms of theft as vehicles, being readily available and transportable by their inherent nature, are very susceptible to theft by both amateurs, for joy riding, for example, or professional thieves for such purposes as resale of the vehicle or parts thereof or use of the vehicle in further criminal activities. This problem as been long recognized and addressed by various anti-theft systems of greater or lessor degrees of complexity and operating according to a number of different principles.

For example, vehicles are of course typically equipped with door and ignition locks of several different types and of varying degrees of effectiveness that to prevent unauthorized persons from entering or starting the vehicles. Such lock systems commonly require corresponding keys or the entry of security codes to allow access to or activation of the vehicle, and some involve coded "remote" or "keyless" devices and incorporate various types of audible and visual alarm devices. It is commonly known and recognized, however, that such lock systems are easily and commonly bypassed or disabled in various ways, even by children.

Yet other systems provide locking elements that are independent or separate from the vehicle, but which interact with elements of the vehicles to prevent operation of the vehicle. Such devices include, for example, bars that interlock with, for example, the steering wheel and, in many instances, the accelerator or brake pedal or both, to lock these elements into one position. Such devices, while being typically more effective than simple ignition and door locks, may still be bypassed in various ways, such as by removal or disassembly of the steering wheel, or, for example, by the thieves simply towing away the entire vehicle.

Still other systems include, for example, various forms of radio beacon to indicate the current location of the vehicle to one or more tracking facilities when activated by a tracking facility. Such systems may further include, for example, the capability of remotely disabling essential systems of the vehicle, such as the electrical, fuel or ignition systems, when a code is broadcast from a tracking facility. The tracking elements of such systems, however, may be disabled by skilled thieves if presence of such a system is or becomes known to them, and the various disablement mechanisms may be likewise disabled, or bypassed by simply towing the vehicle.

The present invention provides a solution to these and similar problems of the prior art.

SUMMARY OF THE INVENTION

The present invention is directed to a vehicle anti-theft system that includes a concealed receiver for receiving a control code corresponding to a vehicle and for generating a disablement signal to at least one security device. The security device includes a paint dispensing system, including a paint container for storing paint, a paint propellant device for dispensing the paint from the paint container, and one or more paint dispensers connected from the paint propellant device, the paint dispensers being located adjacent a windshield of the vehicle for dispensing the point onto the windshield. The paint dispensing system is activated by the disablement signal to dispense the paint onto the windshield to obscure vision through the windshield.

The paint is characterized by being capable of immediately adhering to glass under a range of conditions, being difficult to remove from glass, including when newly applied, being sufficiently opaque to effectively obscure vision through the glass, and being of a visually very dominate and noticeable color. In addition, the paint may be dispensed onto the windshield to obscure vision through the windshield during a predetermined period of time to allow a driver time, for example, to safely stop the vehicle.

The vehicle anti-theft system may further include one or more additional security devices activated by the disablement signal for one or more of disabling the vehicle and indicating a current location of the vehicle.

BRIEF DESCRIPTION OF THE DRAWINGS

The invention will now be described, by way of example, with reference to the accompanying drawings in which.

DESCRIPTION OF THE PREFERRED EMBODIMENT(S)

Figure 1:
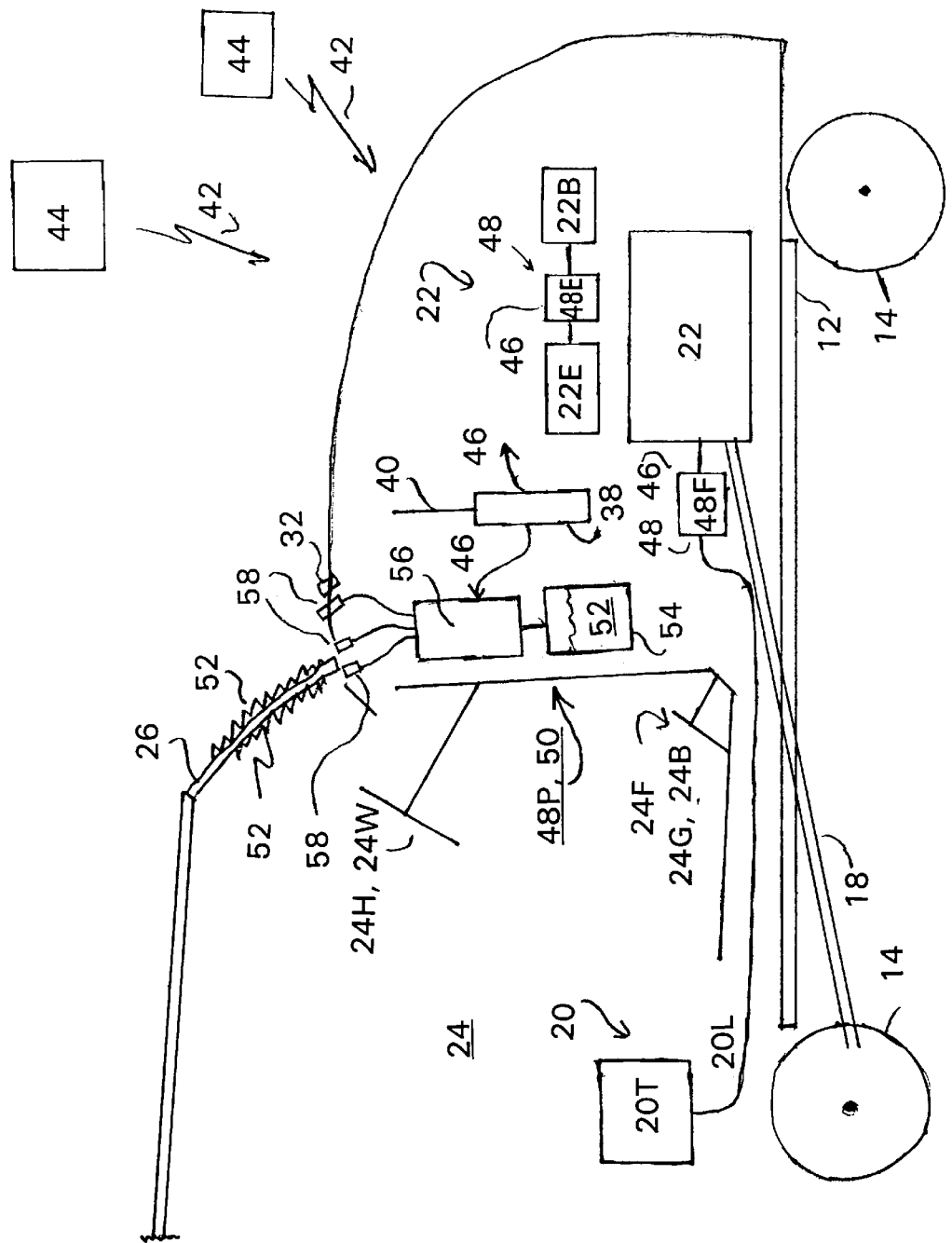
FIG. 1 is a diagrammatic representation of an anti-theft system of the present invention.

Referring to FIG. 1, therein is presented a diagrammatic illustration of an embodiment of the present invention. As represented therein, a typical Vehicle 10 includes a Chassis 12 with Wheels 14 supported on a suspension and axles, an Engine 16 driving a Drive Train 18, a Fuel System 20, which includes a Fuel Tank 20T and Fuel Line 20L, a Battery 22B and associated Electrical System 22E, and a Drivers Compartment 24 containing Hand Controls 24H, such as a Steering Wheel 24W, and Foot Controls 24F, such as Gas and Brake Pedals 24G and 24B.

At least the forward side of the Drivers Compartment 24 will include a Windshield 26 providing the driver with a view ahead of the Vehicle 10 for driving the Vehicle 10. Associated with the Windshield 26 will be one or more Defrost Vents 26V, generally located along the lower inside edge of the Windshield 26 to allow warm air to be blown over the Windshield 26 to defrost or defog the Windshield 26. There may also be a Wiper Recess 28 associated with the outside lower edge of the Windshield 26 to provide a space for storing Wipers 30 and, possibly, one or more Windshield Washer Vents 32 for spraying washer fluid onto the Windshield 26. The Washer Vents 32 may alternatively be located in the Hood 34 of the Vehicle 10, just forward of the Windshield 26, for the same purpose.

An Anti-Theft System 36 of the present invention includes a Receiver 38, typically with an associated Antenna 40, for receiving a Security Code 42 from a Control Facility 44. Both Receiver 38 and Antenna 40 are preferably concealed in the Vehicle 10 in a location and in a manner to be difficult to detect and locate, as is known in anti-theft systems of the prior art employing concealed receivers.

Upon notification that a Vehicle 10 has been or is suspected to have been stolen or is otherwise engaged in an activity wherein disablement of the Vehicle 10 is felt desirable, the Control Facility 44, which may be comprised of multiple Control Facilities 44, depending upon an area to be covered, will transmit the Control Code 42 corresponding to the Vehicle 10. In the Vehicle 10, and upon receiving and verifying the Control Code 42, the Receiver 38 will generate a Disablement Signal 46 to the elements of the Anti-Theft System 36.

Disablement Signal 46 will, in turn, activate Security Elements 48, each of which performs a function or operation in disabling the Vehicle 10. For example, a Security Element 48F may interrupt the Fuel System 20 path to Engine 16, either quickly or gradually, thereby stopping the Vehicle 10 relatively gradually to allow the driver to bring the Vehicle 10 to a safe stop. A Security Element 48E may interrupt the Electrical System 22E for the same purpose. Other Security Elements 48 may, for example, cause the vehicle lights to begin flashing or the horn or an audio alarm to begin sounding, lock the doors, activate the brakes at a controlled rate, release a suitable gas into the drivers compartment, or begin transmitting a beacon or transponder signal to indicate the current location of the Vehicle 10, and so on. As indicated in FIG. 1, Security Elements 48F, 48E and others may be distributed around Vehicle 10 in locations selected as most suitable for the particular Security Elements 48, such as near or in the Fuel System 20 path to Engine 16, at some location near or in the path of essential elements of Electrical System 22E, and so on.

In particular, and according to the present invention, the Disablement Signal 46 will activate a Security Element 48P that comprises a Paint System 50 that includes Paint 52 residing in a Paint Container 54, a Paint Propellent Device 56 for driving the dispensing of Paint 52 from Paint Container 54, and one or more Paint Dispensers 58 for dispensing Paint 52 onto the Windshield 26. As represented in FIG. 1, Paint Container 54 and Paint Propellent Device 56 may, for example, be located in the engine compartment of the Vehicle 10, in the regions adjacent the Windshield 26. Paint Container 54 may be, for example, a simple container, either made as a one-use container or as a refillable container, while Paint Propellent Device 56 may be, for example, an electrically driven pump, similar to those use for windshield washer fluids, or a gas propellent device connected to Paint Container 54 to force paint 52 therefrom. In other embodiments, Paint Propellent Device 56 and Paint Container 54 may be made as a single element, as a one-use unit or as a refillable unit.

Finally, and as also indicated in FIG. 1, Paint Dispensers 58 are essentially simple spray nozzles connected from Paint Propellent Device 56 and Paint Container 54 by, for example, tubing, and may be located, for example, in Defrost Vents 26V, in a Wiper Recess 28, or as separate nozzles mounted in the hood of the Vehicle 10 in the same manner as Windshield Washer Vents 32.

Paint 52 is characterized in being a paint with appropriate "storage" time, which may be years and the capability of flowing under the range of temperatures normally experienced by a Vehicle 10. Paint 52 must also be capable of immediately adhering to glass, such a Windshield 26, in a manner that is difficult to remove, even when wet, must be sufficiently opaque to effectively obscure vision through the glass, and must be of a visually very dominate and noticeable color, such as blue, red, yellow, and so on.

Upon detecting a theft or attempted theft or otherwise unauthorized or illegal use of a Vehicle 10, such as improper or dangerous driving of the Vehicle 10, by the user or any other authorized person, a Control Facility 44 may be notified of the event and of the identification of the Vehicle 10. One or more appropriate Control Facilities 44 may then broadcast the appropriate, corresponding Control Code 42 to the Receiver 38 in the Vehicle 10, which will in turn generate the Disablement Signal 46 to the Security Elements 48, thereby activating the Security Elements 48.

In addition to the actions of the other Security Elements 48, the Paint System 50 will dispense Paint 52 onto the inside or outside of Windshield 26, covering and obscuring Windshield 26 in at least those regions most used by the driver in driving the Vehicle 10 and making the Vehicle 10 essentially undriveable. The spraying of Paint 52 onto Windshield 26 will be performed over a selected period of time, such as 60 to 90 second, and in itself or in combination with the operations of others of Security Devices 48, will bring the Vehicle 10 to a halt and will permit the driver a sufficient period in which to safely stop the Vehicle 10 in a safe location.

At this point, the Vehicle 10 is effectively disabled and the coating of Paint 52 on Windshield 26 is a visual indicator to is suspect or dangerous in some manner and that the Vehicle 10 has been intentionally disabled by authorized persons or authorities. After the Vehicle 10 has been recovered, the appropriate personnel may, for example, reset the Control Code 42 or assign a new Control Code 42, reset the Security Devices 48, including replenishing any elements consumed in disabling the Vehicle 10, such as refilling Paint Container 54 with Paint 52 and Paint Propellent Device 56 with, for example, dispersant gas, and so on. At this time, the Paint 52 may be removed from the Windshield 26 or the Windshield 26 may be replaced, and so on, and the Vehicle 10 will once again be ready for use.

Since certain changes may be made in the above described vehicle anti-theft system without departing from the spirit and scope of the invention herein involved, it is intended that all of the subject matter of the above description or shown in the accompanying drawings shall be interpreted merely as examples illustrating the inventive concept herein and shall not be construed as limiting the invention.

I claim:

1. A vehicle anti-theft system, comprising:
    a concealed receiver for receiving a control code corresponding to a vehicle and for generating a disablement signal to at least one security device, wherein
        the at least one security device is a paint dispensing system,
        the paint dispensing system, including
            a paint container for storing paint,
            a paint propellant device for dispensing the paint from the paint container, and
            one or more paint dispensers connected from the paint propellant device, the paint dispensers being located adjacent a windshield of the vehicle for dispensing the paint onto the windshield,
        the paint dispensing system being activated by the disablement signal to dispense the paint onto the windshield to obscure vision through the windshield.
2. The vehicle anti-theft system of claim 1, further comprising one or more additional security devices activated by the disablement signal for one or more of disabling the vehicle and indicating a current location of the vehicle.

3. The vehicle anti-theft system of claim 1, wherein the control code is transmitted from a control facility.

4. The vehicle anti-theft system of claim 1, wherein the paint is characterized by:
   being capable of immediately adhering to glass under a range of conditions,
   being difficult to remove from glass, including when newly applied,
   being sufficiently opaque to effectively obscure vision through the glass, and
   being of a visually very dominate and noticeable color.

5. The vehicle anti-theft system of claim 1, wherein the paint is dispensed onto the windshield to obscure vision through the windshield during a predetermined period of time.

* * * * *